United States Patent [19]

Reh et al.

[11] 4,347,064

[45] Aug. 31, 1982

[54] PROCESS OF GASIFYING FINE-GRAINED SOLID FUELS

[75] Inventors: Lothar Reh; Martin Hirsch, both of Frankfurt am Main; Gerhard Baron, Hofheim; Eberhard Blaum; Carl Hafke, both of Frankfurt am Main, all of Fed. Rep. of Germany

[73] Assignee: Metallgesellschaft Aktiengesellschaft, Frankfurt am Main, Fed. Rep. of Germany

[21] Appl. No.: 225,952

[22] Filed: Jan. 19, 1981

Related U.S. Application Data

[63] Continuation of Ser. No. 64,977, Aug. 8, 1979, abandoned.

[30] Foreign Application Priority Data

Aug. 18, 1978 [DE] Fed. Rep. of Germany ....... 2836175

[51] Int. Cl.$^3$ .............................................. C10J 3/54
[52] U.S. Cl. .................................... 48/197 R; 48/202; 48/203; 201/31; 201/38; 252/373
[58] Field of Search ................. 48/202, 203, 210, 206, 48/197 R; 201/31, 38; 252/373

[56] References Cited

U.S. PATENT DOCUMENTS

| | | | |
|---|---|---|---|
| 2,579,398 | 12/1951 | Roetheli | 48/202 |
| 2,662,816 | 12/1953 | Kalbach | 48/202 |
| 3,847,563 | 11/1974 | Archer et al. | 48/202 |
| 4,026,679 | 5/1977 | Collin | 48/202 |
| 4,032,305 | 6/1977 | Squires | 48/202 |
| 4,077,778 | 3/1978 | Nahas et al. | 48/202 |
| 4,121,912 | 10/1978 | Barber et al. | 48/206 |

*Primary Examiner*—S. Leon Bashore, Jr.
*Assistant Examiner*—Michael Goldman
*Attorney, Agent, or Firm*—Sprung, Horn, Kramer & Woods

[57] ABSTRACT

A process of gasifying fine-grained solid fuels for the production of a product gas that contains hydrogen, carbon oxides and methane comprises a treatment with steam, oxygen and/or carbon dioxide in two interconnected gasifying stages under a pressure in the range from 2 to 150 bars and at temperatures of 500° to 1500° C. In the first gasifying stage, the fuel is gasified in a circulating fluidized bed by a treatment with gasifying stage. The residual solids which become available in the first gasifying stage are fed to the second gasifying stage and are virtually completely gasified therein, except for residual ash, by a treatment with a gasifying agent which includes oxygen. At least one-half of the product gas from the second gasifying stage is fed to the first gasifying stage and used as fluidizing fluid therein.

9 Claims, 1 Drawing Figure

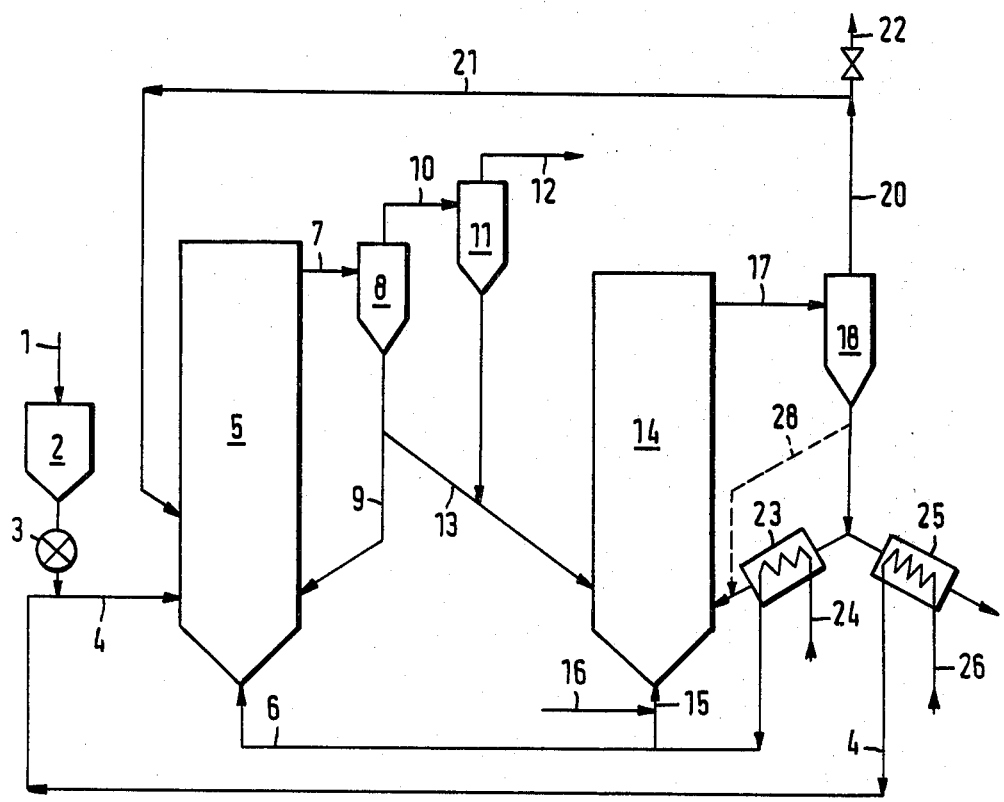

PROCESS OF GASIFYING FINE-GRAINED SOLID FUELS

This is a continuation, of application Ser. No. 64,977, filed Aug. 8, 1979, now abandoned.

BACKGROUND OF THE INVENTION

1. Field of the Invention

This invention relates to a process of gasifying fine-grained solid fuels to produce a product gas which contains hydrogen, carbon oxides, and methane, in two interconnected gasifying stages by a treatment with at least one of the gasifying agents consisting of steam, oxygen and carbon dioxide under a pressure in the range from 2 to 150 bars and at temperatures of 500° to 1500° C. Usually the pressure in the gasifying stages is at least 5 bars and preferably in the range of 10 to 60 bars.

Solid fuels which may be used in the process include particularly coal and lignite as well as peat. The fuel subjected to the gasifying treatment has particle sizes below 3 mm. Oxygen may be used as a gasifying agent in known manner as commercially pure oxygen, air, or oxygen-enriched air. At the relatively high gasifying temperatures, carbon dioxide acts also as an oxidizing gasifying agent.

2. Discussion of Prior Art

From German (BRD) Offenlegungsschrift No. 2,511,191 it is known that carbonaceous material can be gasified in an arrangement in which two interconnected circulating fluidized beds are used. Solid and/or liquid fuel together with steam is charged to the first gasifying stage, which comprises a circulating fluidized bed. The solids left after the reaction in this stage enter in part the second circulating fluidized bed, in which a reaction in the presence of oxygen-containing gas and steam is effected at higher temperatures than in the first stage. The residual solids from the second gasifying stage are returned to the first stage and ensure sufficiently high temperatures therein. Having a high ash content and a low carbon content, these solids fed from the second stage to the first introduce considerable amounts of non-gasi-fiable material into the first stage. Additionally the solid fuel left after the treatment in the second gasifying stage reacts only so slowly that it can hardly be reacted in the first gasifying stage, where the temperatures are lower than anywhere else in the process. For this reason, the desired reaction between the fresh solid fuel and the gasifying agent in the first stage may cease or may be strongly adversely affected.

SUMMARY OF INVENTION

It is an object of the invention to provide an economical process which is of the kind mentioned first hereinbefore and can be carried out at a high rate. This is accomplished according to the invention in that in the first gasifying stage the fuel is partly gasified in a circulating fluidized bed by a treatment with gasifying agents and product gas from the second gasifying stage, the product gas from the first gasifying stage is withdrawn and purified, residual solids which become available in the first gasifying stage are fed to the second gasifying stage and are virtually completely gasified therein, except for residual ash, by a treatment with a gasifying agent, that includes oxygen and at least one-half of the product gas from the the second gasifying stage is fed as a fluidizing fluid to the first gasifying stage.

In the process according to the invention there is no deliberate transfer of solids from the second gasifying stage to the first. Whereas the product gas fed from the second stage to the first will inevitably entrain small quantities of fine solids, these entrained solids are not significant relative to the quantities of solids present in the first gasifying stage and account for less than 1% of the weight of the solids in the circulating fluidized bed of the first stage. It is important in the process according to the invention that the product gas from the second stage transfer sensible heat to the first stage so that the gasifying agents fed to the first stage may consist of steam and possibly $CO_2$ but may contain only little or no oxygen.

The circulating fluidized bed differs from an orthodox fluidized bed in that the fine-grained solids present in the reaction space do not form a distinct boundary. There is no longer a density step between a dense phase and an overlying dust space but the solids concentration in the reactor decreases continuously from bottom to top. The product gas withdrawn from the circulating fluidized bed contains large quantities of solids, which are separated from the gas and returned to the fluidized bed. Owing to the high gas velocities in the circulating fluidized bed, the reactions therein proceed at a high rate at a given temperature. The processing in a circulating fluidized bed is known and has been described, e.g., in Ullmanns Encyklopädie der Technischen Chemie, 4th edition (1973), Vol. 3, pages 433 to 446. Details of the circulating fluidized bed are also known from U.S. Pat. No. 3,579,616, the disclosures of which are hereby incorporated specifically herein by reference.

Reactors of various types may be used for the reaction in the second gasifying stage. For instance, the second stage may be operated just as the first as a circulating fluidized bed. The temperature in the second gasifying stage is preferably below the melting point of ash. If temperatures above the melting point of ash are to be permitted in the second gasifying stage, the latter may preferably consist of a melting cyclone. Melting cyclones are known in the art of furnace engineering and have been described, e.g., in German (BRD) Offenlegungsschrift No. 2,010,872 and U.S. Pat. No. 3,915,692.

To further increase the throughput rates, the gasifying stages may be operated under pressure of 5 to 150 bars, preferably in the range from 10 to 60 bars. For the same reason it is recommendable to feed the second gasifying stage with fresh fuel in addition to the residual solids from the first stage. Additionally, catalytically active substances which accelerate the gasification may be used in the first and/or second gasifying stage. Such substances are, e.g. alkali salts, such as $K_2CO_3$. These substances can be introduced with the solid fuel or with the gasifying agent to the first and/or second gasifying stage.

It will be suitable in practice to maintain solids in the first and second gasifying stages in quantities having a ratio in the range from 6:1 to 1:2 by weight.

It is desired in many cases to obtain a product gas in which the content of sulfur compounds is minimized. Whereas the product gas can be purified to remove the sulfur compounds, particularly $H_2S$, such purification is expensive. Alternatively, the fuel may be gasified in the presence of substances which take up sulfur. Such substances are, e.g., limestone, dolomite, iron oxide or mixtures thereof. They may be admixed in a fine-grained form to the fresh fuel before it is subjected to the gasifying treatment. Alternatively, such substances may be separately fed to the first and/or second gasifying stage. In that case the sulfur is combined in compounds which are not decomposed at the gasification temperatures and which are withdrawn as ash rather than in the product gas.

In most cases the temperatures in the first gasifying stage will be in the range of 700° to 1200° C., preferably in the range of 800° to 1100° C. High temperatures will be preferred when the product gas should contain no or only a minimum of condensible constituents, particularly tar and liquid hydrocarbons. The oxygen content of the gasifying agent may be varied to control the temperature in the gasifying stages. An influence on said temperature can also be exerted by the selection of the inlet temperature of the substances which take part in the reaction. The temperature in the gasifying stages can also be controlled by an indirect heat exchange by means of coolant conduits.

The second gasifying stage is suitably operated at a higher temperature than the first gasifying stage, for example at temperatures in the range of 850° to 1500° C. To that end, the gasifying agent for the second stage is controlled to have a relatively high oxygen content e.g. at least 30 volume percent and generally 40 to 70 volume percent. Temperatures higher than those in the first stage will be required in the second stage if the residual solids from the first stage react only slowly and sufficiently high reaction rates can be obtained only at higher temperatures.

Because the product gas rising from the circulating fluidized bed will always entrain solids in substantial quantities, the point at which fuel is fed can be selected so as to ensure a desired residence time of the fuel in the reaction. If the fuel is fed to the lower portion of the gasifying stage, the residence time will be so long that the products of the dry distillation of the fuel can be virtually completely reacted in the gasifying stage. If the fuel is fed to the upper portion of the fluidized bed, the residence times will be short and the product gas will be rich in products of dry distillation.

In general, it will not be sufficient to remove all solids from the product gas obtained by the gasification according to the invention but said gas will have to be subjected to various conditioning treatments before it can be put to the desired use. It will be useful mainly as a starting material for the production of synthesis gases and fuel gases and for that purpose may be subjected to a thermal or catalytic aftertreatment. For instance, it may be cracked to convert hydrocarbons in the product gas to CO and $H_2$ as synthesis gas components. Alternatively, the product gas may be hydrocracked to convert a major part of its condensible hydrocarbons to methane. The gas may be used as a reducing gas for a direct reduction of iron ores or may be used in combined gas turbine-steam turbine power plants or generally as synthesis gas. Such synthesis gas may be converted in known manner to synthetic natural gas or to methanol or ammonia. The synthesis gas is also available for use in other chemical processes, such as oxosynthesis or the production of acetic acid.

BRIEF DESCRIPTION OF DRAWING

The annexed drawing represents a flow diagram showing a method for carrying out the invention.

DESCRIPTION OF SPECIFIC EMBODIMENT

Fine-grained coal having a particle size below 3 mm is taken from a lock chamber, not shown, and is fed in a duct 1 to a pressurizing unit 2. From the pressurizing unit, the coal is passed through a metering unit 3 and is pneumatically fed to the first gasifying stage 5 via duct 4. The gas which entrains the coal in duct 4 may preferably consist of carbon dioxide or nitrogen or a mixture thereof.

The first gasifying stage 5 consists of a pressure reactor, in which the fuel is maintained in the state of a circulating fluidized bed. A considerable part of the solids in the circulating fluidized bed is continuously entrained out of the fluidizing region by the fluidizing gas and is collected from the gas and returned to the fluidizing region. The coal and the entraining gas are fed to the gasifying stage 5 through an annular duct, not shown, and a plurality of nozzles directed to the enter of the reactor. The gasifying agent serves also as a fluidizing gas and consists mainly of steam, which is fed through duct 6. The gasifying agent may contain also oxygen, air, or a mixture thereof.

Owing to the relatively high velocity of the gas in the first gasifying stage 5, an intensely mixed, highly dilute fluidized bed is formed in that stage, clouds of solids are constantly carried upwardly and threads of solids are constantly carried downwardly. In that operation, part of the fine-grained fuel which has been fed is gasified.

The product gas leaving the gasifying stage 5 through duct 7 has a high solids content. A major portion of said solids are separated from the gas in a succeeding cyclone 8 and are fed via a duct 9 to the lower portion of the first gasifying zone to enter the fluidizing region thereof. The arrangement comprising a fluidized-bed reactor, a product gas duct 7, a cyclone 8 and a return duct 9 is typical of equipment for maintaining a circulating fluidized bed.

Product gas leaving the cyclone 8 is passed in duct 10 to a second cyclone 11, in which part of the residual solids are removed from the gas. The product gas in duct 12 may be subjected to further processing, purification and conversion.

Part of the solids collected in cyclone 8 is branched to duct 13 and together with the solids from cyclone 11 is fed to the second gasifying stage 14. The second gasifying stage 14 shown on the drawing is basically designed like the first gasifying stage 5. However the second gasifying stage can contain other components, e.g., a melting cyclone.

Gasifying agent comprising steam and free oxygen is fed in duct 15 to the second gasifying stage 14. Additional oxygen can be supplied via duct 16, if required. In the second gasifying stage 14, the gasifying agents cause a circulating fluidized bed to be formed, such as has been explained in connection with the first gasifying stage. More oxygen is fed to the second gasifying stage 14 so that the temperature therein is higher than in the second process stage 5.

Solids-containing product gas from the second gasifying stage 14 is fed in duct 17 to a cyclone 18, in which most of the solids are removed from the gas. At least one-half of the product gas, which is now substantially free from solids, is then returned to the first gasifying stage 5 via ducts 20 and 21. Product gas which is not recycled is available in duct 22 for further use. In the usual operation of the gasifying plant, all product gas from the second gasifying stage 14 is recycled via ducts 20 and 21 to the first gasifying stage 5.

The solids collected in the cyclone 18 consist of low-carbon ash. The sensible heat of said solids may be utilized in that part of them can be passed to a first cooler 23 before being recycled to the second gasifying stage 14. The first cooler 23 may consist, e.g., of a fluidized-bed cooler. Gasifying agent from duct 24 is heated in the cooler 23 and is then fed to the two gasifying stages 5 and 14. Part of the solids are branched off and delivers sensible heat in a second cooler 25, in which the entraining gas is heated, which is supplied in a conduit 26 and is subsequently used to entrain in duct 4 the fresh fuel that is to be fed to the first gasifying stage 5. The coolers 23 and 25 may be of various types. For instance, a cooler may be designed for a direct heat transfer and an indirect heat transfer between the hot solids and one or more cooling fluids. For the use in case or need, a bypass duct 28 is provided, which bypasses the cooler 23 and is shown in dotted lines.

EXAMPLES

Example 1

Coal was gasified at a rate of 50 metric tons per hour in a system like that shown on the drawing. On a water- and ash-free basis, the coal had the following analysis in percent by weight

| | |
|---|---|
| C | 86.56 |
| O | 5.27 |
| H | 5.22 |
| N | 1.62 |
| S | 1.18 |
| Cl | 0.15 |

In addition, the coal contained 20% ash. In the first gasifying stage 5, gasification was effected by a treatment with the product gas from the second gasifying stage 14 and with 0.1 standard m$^3$ of steam and 0.2 standard m$^3$ of $CO_2$ per kg of coal. The $CO_2$ was used for the pneumatic feeding of the coal in duct 4. The reactor of the first gasifying stage 5 had an inside height of 15 meters and an inside diameter of 3 meters. Gasification was effected under a pressure of 30 bars.

Product gas at a rate of 2.4 standard m$^3$ per kg of coal left the gasifying plant at a temperature of 1050° C. via duct 12. On a dry basis, the product gas had the following composition in % by weight:

| | |
|---|---|
| CO | 14.6 |
| CO | 58.7 |
| $H_2$ | 25.0 |
| $CH_4$ | 6.8 |
| $N_2$ | 0.5 |
| HCl | 0.1 |
| $H_2S$ | 0.3 |

The product gas was cooled and coarsely purified in known manner by being sprayed with water and recycled condensate.

Carbonaceous residue at a rate of 14.3 metric tons per hour was fed in duct 13 to the second gasifying stage 14 and was reacted therein by a treatment with 0.51 standard m$^3$ of $O_2$ and 0.4 standard m$^3$ of steam per kg of coal. The $O_2$ and steam were fed via duct 15. The pressure was about 30 bars. The equipment of the gasifying stage 14 was exactly like that of the first gasifying stage 5. The product gas from the second gasifying stage 14 was at a temperature of 1200° C. and all of it was recycled via the cyclone 18 and the ducts 20 and 21 to the solids at a rate of 100 metric tons per hour were collected in the cyclone 18 and were distributed between the coolers 23 and 25 at a ratio of 9:1. The solids were cooled in the cooler 23 from 1200 to 1100° C. and were then recycled to the gasifying stage 14.

EXAMPLE 2

To produce a fuel gas for use in a combined gas turbine-steam turbine power plant, a plant like that shown on the drawing was fed with the coal used also in Example 1. To desulfurize the product gas, 75 g limestone per kg of coal were fed to the reactor 5 in addition to the coal.

The coal was pneumatically fed to the reactor 5 by means of 0.2 standard m$^3$ of air per kg of coal. The reactor 5 was also fed with the product gas from the second reactor 14 and with 0.1 standard m$^3$ of steam per kg of coal. The pressure amounted to 30 bars.

The gas was withdrawn from the plant in duct 12 at a rate of 4.2 standard m$^3$ per kg of coal and at a temperature of 950° C. and had the following analysis in % by weight on a dry basis:

| | |
|---|---|
| $CO_2$ | 8.6 |
| CO | 22.2 |
| $H_2$ | 7.2 |
| $CH_4$ | 7.5 |
| $N_2$ | 54.06 |
| HCl | 0.02 |
| $H_2S$ | 0.02 |

That gas, which had been substantially desulfurized, was subjected to a further dust-collecting treatment, and was then fed as fuel gas to a steam bailer operated under superatmospheric pressure.

Carbonaceous residue at a rate of 14.7 metric tons per hour was fed in duct 13 from the first gasifying stage to the second and was reacted there by a treatment with 2.6 standard m$^3$ of air and 0.4 standard m$^3$ of steam per kg of coal fed to the reactor 5. The pressure amounted to 30 bars and the temperature to 1200° C. All product gas from that stage was recycled to the first gasifying stage via the cyclone 18 and the ducts 20 and 21.

Solids were collected in the cyclone 18 at a rate of about 105 metric tons per hour and just as in the first Example were distributed between the coolers 23 and 25. In the cooler 23, the solids were cooled to about 1000° C. before they entered the reactor 14.

EXAMPLE 3

A plant as shown on the drawing was used to produce a synthesis gas from lignite which had the following analysis in % by weight:

| | |
|---|---|
| C | 68.0 |
| H | 5.3 |
| O | 25.7 |
| N | 0.6 |
| S | 0.6 | and also contained 5% ash and 8.0% moisture. The lignite was pneumatically fed to the reactor 5 by means of 0.2 standard m$^3$ of $CO_2$ per kg of lignite. The reactor 5 was also fed via duct 21 with the product gas from the second gasifying stage 14 and via duct 6 with 0.1 standard m³ of steam per kg of lignite. The gasifying pressure was about 30 bars and the temperature in the reactor 5 about 1050° C.

Gas leaving the plant in duct 12 at a rate of 2.46 standard m³ per kg of lignite had the following composition in % by volume on a dry basis:

| | |
|---|---|
| $CO_2$ | 30.47 |
| CO | 43.30 |
| $H_2$ | 24.67 |
| $CH_4$ | 1.18 |
| $N_2$ | 0.26 |
| $H_2S$ | 0.12 |

The gas was cooled, purified and conditioned in the usual manner before it was fed to a synthesis plant.

Carbonaceous residue at a rate of 3.7 metric tons per hour was fed in duct 18 to the second gasifying stage 14 and was gasified therein at 1200° C. and 30 bars by a treatment with 0.3 standard m³ of water vapor and 0.74 standard m³ of oxygen per kg of feed lignite. Solids at a rate of 25 metric tons per hour were collected in the cyclone 18 and were distributed between the coolers 23 and 25 as in Example 1. The temperature was lowered by about 300° C. in the cooler 23.

What is claimed is:

1. In a process of gasifying fine-grained solid fuels to produce a product gas which contains hydrogen, carbon oxides and methane in two interconnected gasifying stages by treatment with at least one of the gasifying agents of the group consisting of steam, oxygen and carbon dioxide, the gasifying stage containing a first reactor and a first separation zone, said first reactor containing a circulating fluidized bed zone, fresh fine-grained solid fuel is introduced into said first reactor of the first gasifying stage and partially gasified therein and product gas is withdrawn from said first separation zone, maintaining a temperature in the first gasifying stage in the range of 800° to 1100° C., in said first separation zone, solids are separated from said product gas and said separated solids are divided into two partial streams, a first partial stream of which is recycled into the first gasifying stage and the second partial stream of solids is fed into the second gasifying stage, said second gasifying stage containing a second reactor and a second separation zone, said second reactor containing a circulating fluidized bed zone, in said second separation zone solids are separated from the hot gas produced in said second gasifying stage, feeding gasifying agent into the reactor of the first gasifying stage which consists mainly of steam and contains less oxygen than the gasifying agent fed into the second gasifying stage; and maintaining a temperature in the second gasifying stage which is higher than the temperature maintained in the first gasifying stage and is below the melting point of ash formed from the solid fuel; the improvement which comprises
    A. maintaining a pressure in the first and second gasifying stage in the range of 10 to 60 bars;
    B. feeding at least one-half of the hot gas from the second separation zone into the reactor of the first gasifying stage;
    C. a first part of the separated solids from the second separation zone is recycled to the second gasifying stage and the balance of said separated solids is withdrawn, and
    D. cooling that portion of solids withdrawn in step C and neither feeding the cooled withdrawn solids into said first nor said second gasifying stage.

2. A process according to claim 1, wherein hot gas from the second gasifying stage is fed as a fluidizing fluid to the first gasifying stage.

3. A process according to claim 1 wherein product gas from the first or second fluidized bed stages is purified to remove $CO_2$, and the so separated $CO_2$ is employed as a gasifying agent for fuel entering the first or second fluidized bed stages.

4. A process according to claim 1 wherein the second gasifying stage is fed with fresh fuel in addition to the solid residue from the first stage.

5. A process according to claim 1 wherein a catalytically active substance which accelerates the gasification is fed to the first and/or second gasifying stage.

6. A process according to claim 1 wherein the fuel is fed to the upper portion of the first gasifying stage and a product gas rich in products of dry distillation is withdrawn from said first stage.

7. A process according to claim 1 wherein the product gas which has been withdrawn is subjected to a thermal or catalytic aftertreatment in order to condition the gas for use in subsequent processes.

8. A process according to claim 1 wherein the product gas is used as a starting material for the production of reducing gas for use in the direct reduction of iron ores or is used in combined gas turbine-stream turbine power plants or as a synthesis gas.

9. A process according to claim 1, wherein in each gasifying stage, the fine-grained solids are gasified by the respective gasifying agents such that there is not formed a distinct boundary between the solids and the gases and a cloud of solids is formed and carried upwardly by said gasifying agent and threads of solids are constantly carried downwardly.

* * * * *